United States Patent

Addeo et al.

[11] Patent Number: 5,811,039
[45] Date of Patent: Sep. 22, 1998

[54] PROCESS FOR FABRICATING BODIES OF POLYMERIC MATERIAL WITH FOAMED CORE

[75] Inventors: Antonio Addeo, Novara; Annibale Vezzoli, Carugo; Antonio Zentile, Milan, all of Italy

[73] Assignee: Montell Italia S.p.A., Milan, Italy

[21] Appl. No.: 271,243

[22] Filed: Jul. 6, 1994

Related U.S. Application Data

[63] Continuation of Ser. No. 989,218, Dec. 11, 1992, abandoned.

[30] Foreign Application Priority Data

Dec. 12, 1991 [IT] Italy ............................ MI91 A 003340

[51] Int. Cl.$^6$ ............................ B29C 44/06; B29C 44/12
[52] U.S. Cl. ...................... 264/46.6; 264/46.6; 264/46.8; 264/53
[58] Field of Search ................. 264/45.1, 46.4, 264/46.6, 46.8, 45.4, 53

[56] References Cited

U.S. PATENT DOCUMENTS

| | | | |
|---|---|---|---|
| 2,865,800 | 12/1958 | Stastny | 264/45.4 |
| 2,977,639 | 4/1961 | Barkhuff, Jr. et al. | 264/45.4 |
| 3,717,922 | 2/1973 | Witkowski | 264/46.8 |
| 3,725,320 | 4/1973 | Wang | 264/53 |
| 3,864,206 | 2/1975 | Linderoth | 156/79 |
| 4,025,372 | 5/1977 | Fenton | 156/79 |
| 4,053,545 | 10/1977 | Fay | 264/46.4 |
| 4,144,296 | 3/1979 | Dickens | 264/46.8 |
| 4,389,358 | 6/1983 | Hendry | 264/45.1 |
| 4,548,775 | 10/1985 | Hayashi et al. | 264/51 |
| 4,676,938 | 6/1987 | Karklin et al. | 264/46.5 |
| 4,964,794 | 10/1990 | Ubelacker et al. | 425/117 |
| 5,094,789 | 3/1992 | Odhner | 264/45.4 |

FOREIGN PATENT DOCUMENTS

| | | | |
|---|---|---|---|
| 744053 | 7/1970 | Belgium | 264/46.4 |
| 0 353 490 A2 | 2/1990 | European Pat. Off. . | |
| 0 363 594 A2 | 4/1990 | European Pat. Off. . | |
| 2216142 | 8/1974 | France . | |
| 3604175 | 8/1986 | Germany | 264/46.8 |
| 57-188327 | 11/1982 | Japan | 264/46.4 |
| 62-035833 | 2/1987 | Japan | 264/46.8 |
| 63-161990 | 7/1988 | Japan | 264/46.8 |

OTHER PUBLICATIONS

European Search Report for European Counterpart Application No. 92121152.0 (1993).

World Patents Index Latest, Derwent Publications Ltd., An 84–241258 (1984).

*Primary Examiner*—Allan R. Kuhns
*Attorney, Agent, or Firm*—Bryan Cave LLP

[57] ABSTRACT

A process is presented for fabricating composite bodies of thermoplastic material including a foamed core bonded to a compatible thermoplastic sheet. A sheet of thermoplastic material is first preheated and then thermoformed on a first half-mould. The first half-mould with the thermoformed sheet is positioned opposite a second half-mould to form a hollow chamber therebetween. A foamable thermoplastic material containing one or more liquid hydrocarbons is injected into the hollow space at a temperature sufficiently high to permit the foamable material to expand and bond to the thermoformed sheet.

5 Claims, 1 Drawing Sheet

PROCESS FOR FABRICATING BODIES OF POLYMERIC MATERIAL WITH FOAMED CORE

This is a continuation of U.S. application Ser. No. 07/989,218, filed Dec. 11, 1992, now abandoned.

A process for fabricating heat-insulating and/or structural shaped bodies comprises thermoforming a sheet on a first half-mould and subsequently injecting a thermoplastic foam into the hollow chamber enclosed between said thermoformed sheet, and a second half-mould.

The present invention relates to a process for fabricating bodies of polymeric material. In particular, the present invention relates to a process and a relevant equipment for fabricating heat-insulating structural bodies useable in the sector of household appliances, for examples panels for refrigerator cabinets, and the like.

At present, such bodies are manufactured by fabricating, by thermoforming, two half-shells which are assembled with each other by welding or glueing; the hollow chamber comprised between both said half-shells is subsequently filled with foamed polyurethane, according to the well-known RIM technology. As an alternative route, the blow-moulding technique is used, according to which into the interior of an enbloc hollow shell, a foamable polyurethanic blend is injected.

In both of about said technologies, the characteristics of adhesiveness of the polyurethanic blend are used, which also contains a chloro-fluorinated foaming agent (Freon, and the like).

Therefore, a structural article of manufacture is obtained in which the foamed core firmly adheres to the external "skin".

Although said technologies known from the prior art makes it possible article of manufacture to be obtained with good mechanical and aesthetical characteristis, the use of such known technologies causes environmental problems as regards the impossibility of recycling the article of manufacture (which is constituted by a thermosetting foamed core of different nature from the coating thermoplastic material), as well as regards the use of chlorofuorocarbons which are known to suffer from problems of interaction with ozone present in stratosphere.

The purpose of the present invention is of providing a process of the above specified type which makes it possible the above said drawbacks to be overcome in a simple and cheap way.

Such a purpose is achieved thanks to the process comprising the following steps:

thermoforming a sheet of thermoplastic polymeric material on a first half-mould, positioning said first half-mould with the thermoformed sheet opposite to a second half-mould, so as to define a hollow chamber enclosed between said second half-mould and said thermoformed sheet, injecting a foamable thermoplastic polymeric material into said hollow chamber, with said material being compatible with the material which constitutes said thermoformed sheet, so as to get bonded to it substantially by thermowelding, and de-moulding said body.

By "foamable thermoplastic material" any thermoplastic materials are meant herein, which comprise a foaming agent, such as, for example, $CO_2$, $N_2$, aliphatic hydrocarbons, and so forth, which, once injected into the hollow chamber at a temperature slightly higher than polymer softening temperature, freely expands inside said hollow chamber, until it comes into contact with said thermoformed sheet. The temperatures of the foamable polymeric material and of the thermoformed sheet are so selected as to cause a perfect adhesion by localized melting to occur, which is such as to secure that the fabricated article will be monolithic. It results it evident that, in order that such an adhesion may occur, the materials which constitute said foamed core and said sheet should be compatible with each other, i.e.,they should belong to the same family of polymers. This feature secures the possibility of recycling the article of manufacture at the end of its useful life.

Another advantage displayed by the process according to the present invention is the simpleness of the equipment and the rapidity of the production cycle. In fact, the injection nozzle for the foamed polymeric material is integrally mounted with the second half-mould.

The resulting article of manufacture can be advantageously coated on its opposite side, relatively to the thermoformed sheet, with a second half-shell, e.g., bonded by glue, only performing the functions of rendering the heat-insulating layer compact, and sheltering it. Such a half-shell, which is not a load-bearing one, may be constituted by a plurality of components, which may also be made of different materials, such as, e.g., metal plate or grid. For example, when the heat-insulating structural element is a cabinet for refrigerators, the second half-shell may be constituted by three parts assembled with one another; the first two of them, made of metal plate, will be suitable for constituting the surface finish of the external side walls of the cabinet; and the third one, consisting of a metal grid, will be suitable for constituting the surface finish of the bottom wall, onto which the condenser for the refrigerant will be applied. If the heat-insulating structural element constitutes a refrigerator cabinet door, the second half-shell will be preferably manufactured as an enbloc part, for example by thermoforming, in such a way to fit the shape of the foamed core.

The foamable polymeric material preferably is the same as used for manufacturing the thermoformed sheet. Such a material can advantageously be polystyrene, impact-resistant polystyrene, polystyrene modified with such polar monomers as acrylonitrile, styrenic alloys such as ABS, SAN, poli(vinyl cloride), high-, medium-, low-density polyethylene, polypropylene, impact-resistant polypropylene, ethylene/propylene copolymers, acrylic and/or methacrylic resins, polymethacrylates, polyester resins such as PET, PBT. Preferred materials are polystyrene, high-impact polystyrene, styrenic alloys, polypropylene and high-impact polypropylene.

The plate or sheet to be thermoformed, having an average thickness comprised within the range of from 0.5 mm to 20 mm, is brought to a temperature close to the material softening temperature, generally higher than 100° C., preferably comprised within the range of from 120° to 200° C. as a function of the polymer used, for example by I.R-irradiation, or by using electrically heated plates.

The thermoforming of the sheets on the mould can be carried out according to several techniques, as a function of thermoforming depth. For example, inside the mould a vacuum can be created, or into said mould compressed air can be injected through the same bores used for vacuum application in order to pre-stretch the plates or sheets, and only subsequently vacuum is made inside the mould.

A further purpose of the present invention is of providing a suitable equipment for practicing the above said process, and which makes it possible said process to be substantially automated. Such an equipment comprises a device for thermoforming a sheet on a first half-mould, a second half-mould provided with an injection nozzle for a foamable polymeric material, and suitable for being positioned in a position facing the first half-mould, so as to define, on closing said half-moulds, a shaped hollow chamber, an injection device, for injecting foamable polymeric material, associated with said second half-mould, means for moving the first half-mould, suitable for transferring said first half-mould from the thermoforming device to the injection device, and means for de-moulding the manufactured article.

Preferably, the means for moving said first half-mould comprise a rotary carrousel suitable for supporting a number of first half-moulds equal to the number of the processing steps.

Such steps comprise, in particular, positioning and preheating the sheet, thermoforming it, trimming the edges of the sheet, injecting the foamable polymeric material, cooling the foamed polymeric material and de-moulding the manufactured article.

Further advantages and characteristics of the process and of the equipment according to the present invention will be evident from the following disclosure in detail, supplied for merely exemplifying, non-limitative, purposes, and made by referring to the accompany drawings, in which:

DETAILED DESCRIPTION OF THE INVENTION

Figure 1:
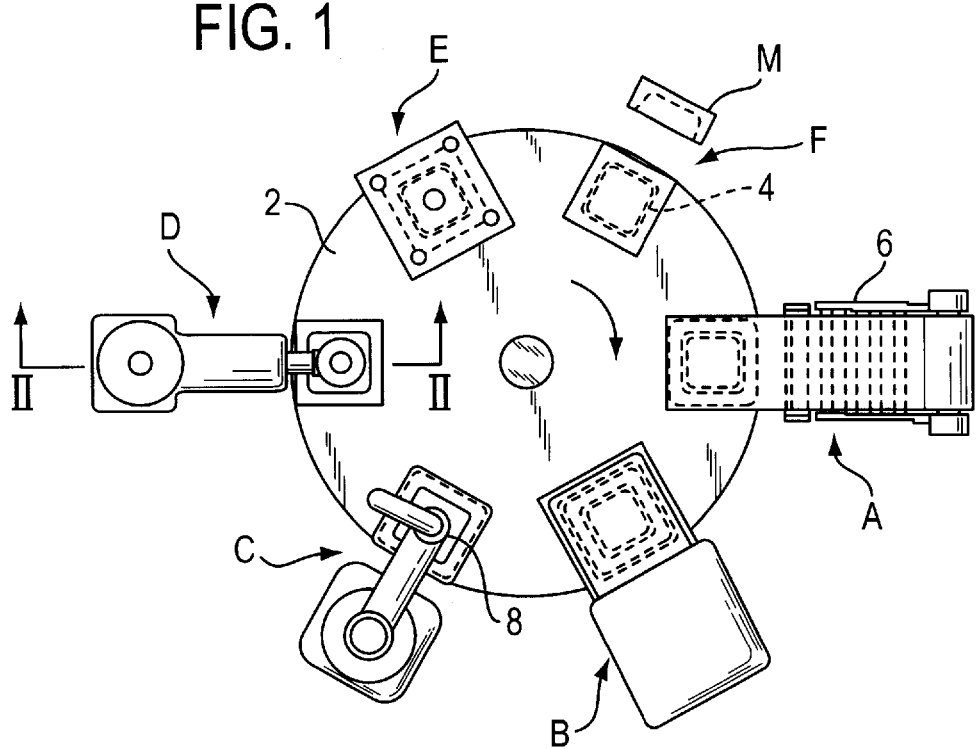
FIG. 1 shows a plan view of the equipment used in the process according to the invention.
Figure 2:
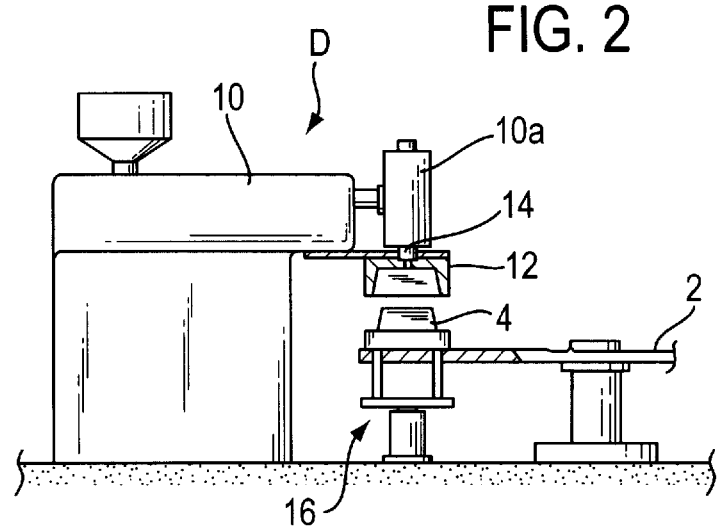
FIG. 2 shows a sectional view according to line II—II, on an enlarged scale, of FIG. 1.

Referring to the drawings, with the reference numeral 2 a device is indicated, of rotary carrousel type, which performs the task of moving convex half-moulds 4; to each station of the half-mould moving carrousel device a process step corresponds.

At a first station A, a sheet of thermoplastic material is pre-heated in a heating device 6, and is transferred to the relevant half-mould 4, at a higher temperature than the polymer softening temperature. At the end of the heating step, the sheet is transferred to a station B by means of a rotary movement in clockwise direction, looking at FIG. 1, of the carrousel 2. At the station B, the sheet is thermoformed on the half-mould 4. The thermoformed sheet is subsequently transferred to a station C, at which a trimming unit 8 shears and trims the edges of the sheet.

The thermoformed sheet with trimmed edges is then transferred to a station D in which an extruder 10 with accumulation head 10a is used. At the station D the carrousel 2 positions the convex half-mould 4 under a concave half-mould 12 installed under the accumulation head 10a. In the centre of said concave mould, an injection nozzle 14 for the foamable polymeric material is provided. A lifting device 16 is suitable for positioning the convex half-mould 4 and the relevant thermoformed sheet against the concave half-mould 12 fastened onto the accumulation head 10a. In such a way, the thermoformed sheet results to be enclosed inside the interior of a closed mould, inside which the polymeric material to be foamed is injected.

The injection operation is carried out by means of hydraulic ram installed inside the accumulation head 10a which, after the opening of a valve provided at the bottom of the same head, transfers the blend of thermoplastic material and foaming agent into the hollow chamber inside the closed mould. Owing to the low pressure existing inside said hollow chamber inside the mould, said blend can freely expand, until it completely fills the hollow chamber. After a lowering of the half-mould 4 bearing the manufactured article, indicated in the drawings with the reference character M, said manufactured article is moved to a cooling station E, followed by a station F at which the manufactured article M is de-moulded.

The present invention is now further disclosed by referring to the following examples.

EXAMPLE 1

An extruded sheet of 3 mm of thickness, manufactured from polypropylene marketed by the Company Himont under the designation Moplen EPQ30R, having a melt flow index of 0.7 g/10 minutes was thermoformed on the convex portion of a half-mould having a parallelepipedal geometry with overall dimensions of 600×1100×50 mm.

The surface temperature of the sheet, recorded at the end of the heating step, was of 185° C.

The forming technique adopted was vacuum-forming.

After the peripheral edges of the vacuum-formed sheet being shorn and trimmed, said sheet was transferred, together with the half-mould on which it was thermoformed, under the accumulation head of an extruder.

To the extruder a blend was fed which was composed by 100 parts of polypropylene ex Himont, marketed under the designation Profax HMS PF 814, having a melt index of 2,5 g/10 minutes; 1.0 parts of "Hydrocerol Compound" ex Boehringer, e 0.5 parts of zinc stearate.

The extruder used is a twin-screw extruder with co-revolving screws, of 90 mm of diameter, and with a length-to-diameter (L:D) ratio of 16.6

A mixture of isobutane and butane in the ratio of 30:70 was injected into the extruder, directly into the molten polymeric mass, at a distance, from polymer feeding point, of approximately ⅓ of total extruder length.

The hydrocarbon mixture was injected with a flow-rate equivalent to 7% by weight, as computed relatively to the weight of polypropylenic resin.

From a homogenizing temperature of approximately 215° C., the temperature of the molten mass constituted by the polymer, the additives and intimately mixed gasses, decreases down to an extruder outlet value of 160° C.

From the extruder, the mixture of polymer and foaming agent flows through a heated feeding channel and fills an accumulation chamber having a maximal value of 4 liters.

The pressure measured at the outlet end of extruder screw was of 100 bar.

In this step, with the aid of hydraulic jacks, the half-mould on which the polypropylene sheet was thermoformed, was moved and caused to fit together with the other half-mould, and positioned integral with the extruder accumulation head.

In that way, said thermoformed sheet resulted to have been enclosed inside the interior of a closed mould, into which the material to be foamed was injected.

The injection operation was carried out by means of a hydraulic ram installed inside the accumulation head, which ram, by moving downwards, when the valve installed at the bottom of the same head was opened, made it possible the mixture to be transferred into the mould hollow.

In order to control the flow of said foamable mixture, a closure valve was used, which had a round cross-section of 12 mm of diameter, with a throughput of 2160 kg/hour.

The injection time was of 2 seconds, to which an amount of injected foamable mixture of 1.2 kg corresponded.

The end product obtained is a double-layer structural body which reproduces the shape of mould hollow, and is constituted by an external layer of compact polypropylene, having a thickness of aproximately 50 mm, and having an average density of 35 kg/m$^3$.

The foamed material and the compact skin were perfectly welded to each other.

EXAMPLE 2

An extruded sheet of 3 mm of thickness, produced by starting from a polystyrene grade marketed by the Company Enichem Polimeri with the designation Edistir SRL 800, having a melt flow index of 3.5 g/10 minutes was thermoformed on the same mould, and using the same technique as used in Example 1.

At the end of the heating step, the measured temperature of the sheet was of 175° C.

To the extruder, a blend constituted by 100 parts of a polystyrene grade marketed by the Company Enichem Polimeri with the designation Edistir N 1380, having a melt flow index of 3.0 g/10 minutes, 0.5 parts of "Hydrocerol Compound" ex Boehringer and 0.2 parts of zinc stearate was fed.

The foaming agent used is the same mixture of butane/isobutane 70:30 of Example 1, with a flow rate equivalent to 6% by weight, as referred to the weight of polystyrene resin.

The pressure measured at extruder screw outlet end was of 160 bar, with a temperature of the molten material equal to 145° C.

In this example, a closure valve was used which had a bore of 20 mm of diameter, with a throughput of 2160 kg of mixture/hour, to which, during an injection time of 2 seconds, an injected amount of 1.2 kg corresponded.

The end product obtained was a double-layer structural body which reproduces the shape of the hollow chamber of the mould, and is constituted by an external layer of compact polystyrene, having an average thickness of 2.8 mm, and an upper foamed layer of 50 mm of thickness, having an average density of 35 kg/m$^3$.

Also in this case, a perfect welding of the layers to each other was obtained.

We claim:

1. A process for fabricating bodies of polymeric material, the process comprising the steps of:

(a) preheating a sheet of thermoplastic polymeric material to a temperature greater than about 100° C., the sheet of thermoplastic material having a thickness of between about 0.5 to 20 mm;

(b) transferring the sheet to a first half-mould;

(c) thermoforming the sheet on the first half-mould;

(d) positioning the first half-mould with the thermoformed sheet opposite to a second half-mould, so as to define a hollow chamber enclosed between the second half-mould and the thermoformed sheet;

(e) injecting a mixture of (1) a foamable thermoplastic polymeric material compatible with the material which constitutes the thermoformed sheet and (2) one or more liquid hydrocarbons as foaming agents into the hollow chamber; the injection taking place in about two seconds or less, the hollow chamber having a pressure less than or equal to the surrounding atmosphere and the injected material being at a temperature sufficiently high to expand inside the hollow chamber and, once the injected material comes into contact with the surface of the thermoformed sheet, being substantially bonded to the thermoformed sheet by thermowelding; and (f) demoulding the body.

2. Process according to claim 1, wherein the polymeric material the sheet consists of, is substantially identical to the foamable polymeric material.

3. The process according to claim 1, wherein the sheet of thermoplastic material is preheated to a temperature of between 120° and 200° C.

4. The process according to claim 1 wherein the pressure of the hollow chamber is about one atmosphere.

5. The process according to claim 1 wherein said one or more hydrocarbons are selected from the group consisting of isobutane and butane.

* * * * *